July 27, 1954

C. M. EASON 2,684,742

AIR OPERATED CLUTCH WITH INTERCHANGEABLE
AIR OPERATED POWER UNIT

Filed July 26, 1949

INVENTOR.
Clarence M. Eason,
BY Brown, Jackson,
Boettcher & Dienner
Attys.

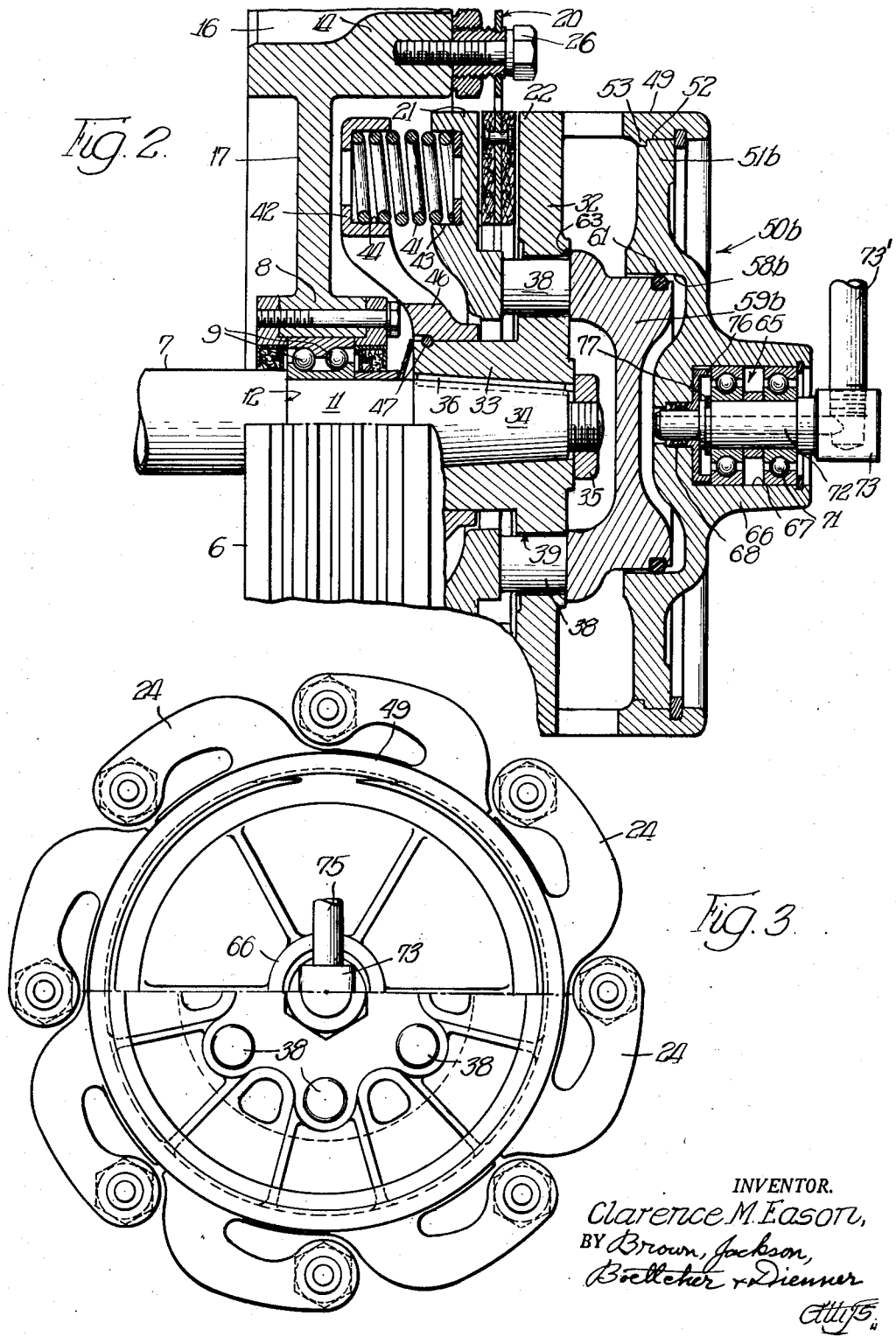

July 27, 1954
C. M. EASON
2,684,742
AIR OPERATED CLUTCH WITH INTERCHANGEABLE
AIR OPERATED POWER UNIT
Filed July 26, 1949
3 Sheets-Sheet 3
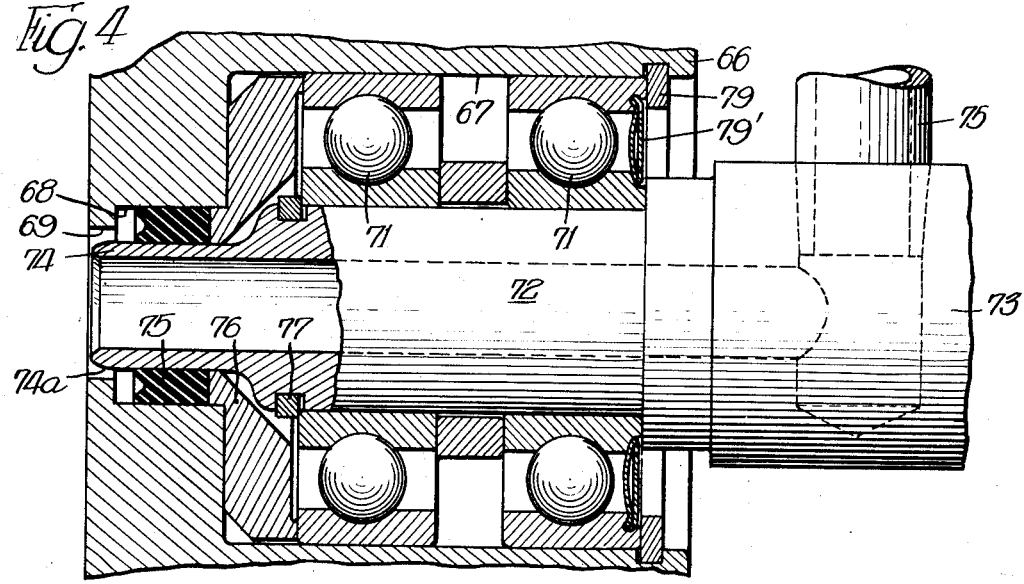
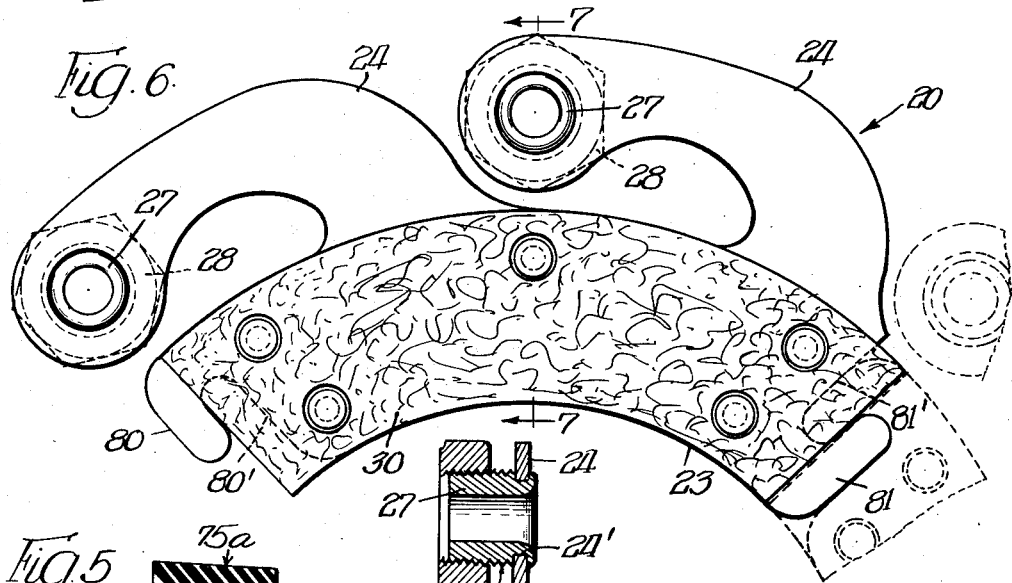
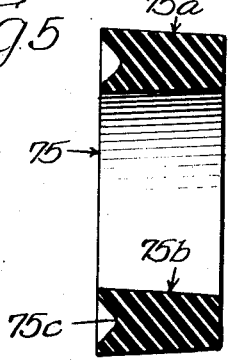
INVENTOR.
Clarence M. Eason,
BY Brown, Jackson,
Boettcher & Dienner
Attys.

Patented July 27, 1954

2,684,742

UNITED STATES PATENT OFFICE 2,684,742

AIR OPERATED CLUTCH WITH INTERCHANGEABLE AIR OPERATED POWER UNIT

Clarence M. Eason, Waukesha, Wis., assignor to Industrial Clutch Corporation, Waukesha, Wis., a corporation of Wisconsin Application July 26, 1949, Serial No. 106,942

4 Claims. (Cl. 192—91)

1

The present invention relates to a friction drive clutch. In one preferred embodiment of the invention, the clutch is adapted to be operated by compressed air, but certain features of the invention are not necessarily limited to air operated clutches.

Air operated clutches have a wide variety of uses in many fields, particularly where automatic clutch operation is desired, or where it is desired to relieve the operator of a heavy burden in actuating the clutch manually. One very extensive field of use is for the automatic starting and stopping of the drive to air compressors.

The clutch herein described has been designed specifically for use on air compressors employed as auxiliary equipment in a stationary power plant. In such cases the prime mover is constantly running and the air compressor is required to operate only a small fraction of the time.

Common practice in the past has been to provide an unloader acting on the air cylinder valves, thereby allowing the compressor to run idle except for the relatively short periods when it was necessary to build up pressure in the air storage tanks. Another common arrangement is to provide independent electric motors for driving the air compressor with automatic pressure actuated switches for starting or stopping the driving motor.

With my improved air operated clutch, the compressor drive can be taken directly from the constantly running power plant engine, and through the use of a simple, inexpensive pressure operated valve the compressor can be started or stopped by clutch action without resorting to unloader valves or independent electric motors.

In some power plant auxiliary installations, an air compressor may be required to supply air at relatively low pressure: i. e. 80 to 100 pounds per square inch for conventional shop use, while in other installations it might be required to furnish air for the operation of equipment (as for starting diesel engines) requiring pressures up in the 250 to 1000 pounds per square inch range.

In each of the above situations, it is advantageous to utilize this source of compressed air for controlling the engaging and releasing of the drive clutch through which the compressor is adapted to be intermittently driven. It will be seen that in the low pressure situation referred to above the air pressure available for operating the clutch is in the range of 80 to 100 pounds or so, and that in the high pressure situation the air pressure available for operating the clutch may run up to 1000 pounds per square inch.

2

Heretofore, in order to take care of these two different pressure situations, it has been necessary to manufacture one line of clutches for the lower pressures, and to manufacture another separate line of clutches for the higher pressures; or else employ pressure reducing valves or other complications in the situation using the higher pressures.

One of the objects of the present invention is to avoid the expense, inconvenience and complication of having to manufacture and stock two separate lines of clutch structures for the two different pressure ranges. This object is attained by a unique design wherein the same clutch structure is employed for both pressure ranges, but different size power units are capable of interchangeable mounting in this standard clutch structure for accommodating the different pressure ranges.

Another object of the invention is to provide an improved rotating seal through which the compressed air is admitted axially into the cylinder area of the rotating cylinder assembly. This rotating seal embodies improved features of construction which enable it to handle these relatively high air pressures, in the neighborhood of 1000 pounds per square inch, without leakage and without objectionable friction or any tendency to run hot. This improved seal is very simple, is also inexpensive to construct and assemble, and permits quick and easy replacement of the wearable element.

Another object of the invention is to provide an improved construction of clutch disk of the type comprising a series of interconnected arcuate segments mounted by flexible mounting fingers which permit lateral shifting movement of the arcuate disk segments in the operations of engaging or releasing the clutch. One of the distinguishing features of these clutch segments is a unique relation of interlocking fingers formed integrally with the ends of the metallic segments and adapted to have interfitting engagement to connect the adjacent ends of adjacent segments. This is less expensive to manufacture and easier to assemble than the constructions shown in my prior Patents 2,259,461 and 2,303,201, and is equally or more effective for interconnecting the segments. Another distinguishing feature of these clutch segments is an improved adjustable mounting arrangement at the end of each flexible mounting finger of the segment. This improved mounting arrangement comprises an externally threaded sleeve or grommet secured to the finger and adapted to pass a cap screw through its center and to receive a jamb nut over its threaded exterior. These parts coact to facilitate the mounting of the segments and also to facilitate the inward or outward "alignment" adjustments relatively to the flywheel or annulus upon which the clutch segments are mounted.

Other features or advantages of the invention will be apparent from the following detail description of one preferred embodiment thereof. In the accompanying drawings illustrating such embodiment:

Figure 2 is a similar fragmentary view showing a smaller size of cylinder and piston assembly mounted in said power unit mounting ring for adapting the clutch to a relatively high range of air pressures, this figure showing the clutch released;

Figure 3 is an end view on a smaller scale, partly in elevation and partly in section, taken approximately on the plane of the line 3—3 of Figure 1;

Figure 4 is a fragmentary axial sectional view of the preferred form of rotating seal, this view being on a considerably larger scale;

Figure 5 is a sectional view of the packing ring of the rotating seal, showing its molded formation prior to assembly in the seal;

Figure 6 is an elevational view of one of the improved arcuate clutch segments; and Figure 7 is a detail sectional view taken on the plane of the line 7—7 of Figure 6.

Figure 1:
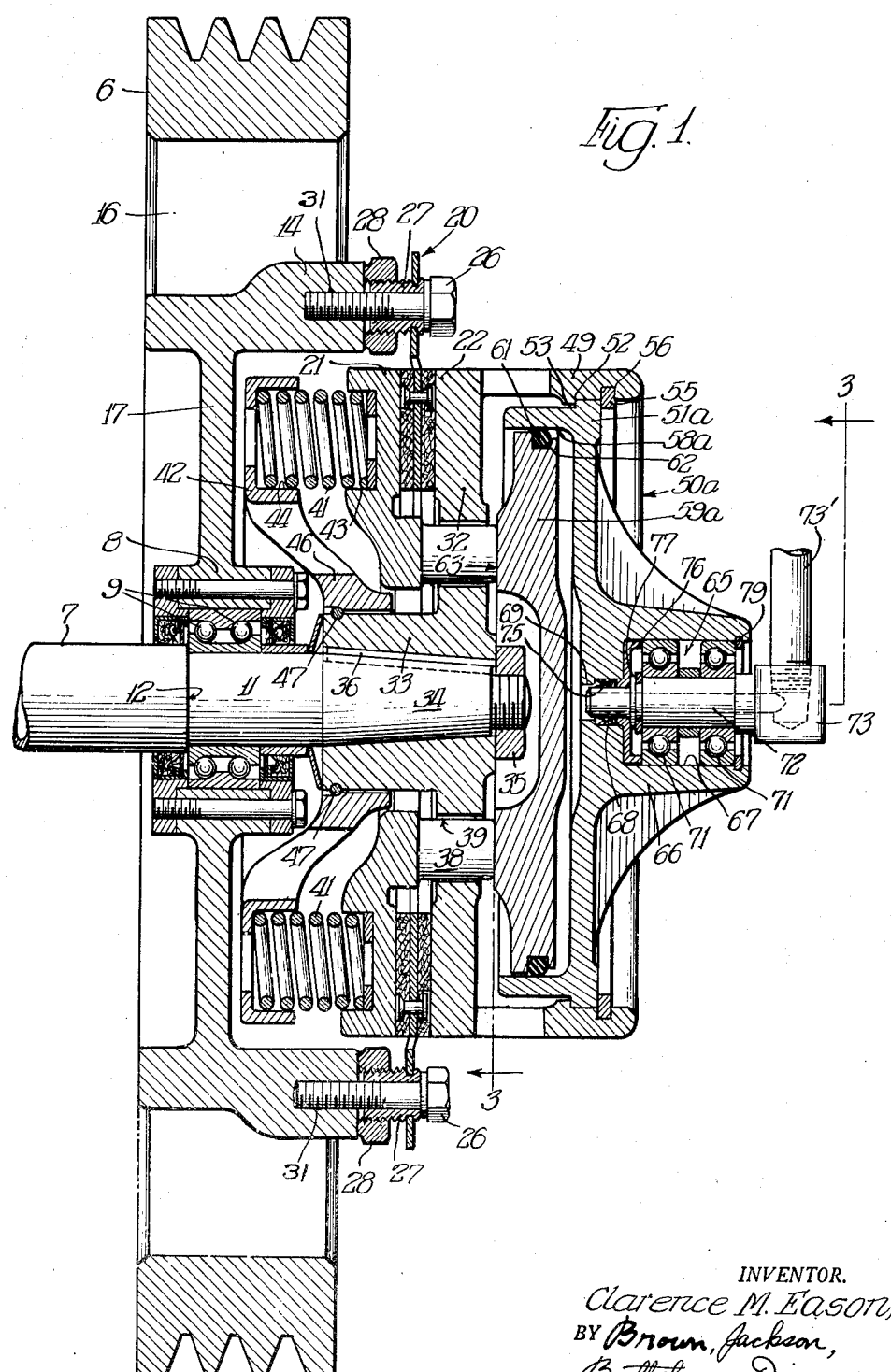
Figure 1 is an axial sectional view of the improved clutch showing a large size of cylinder and piston assembly mounted in the power unit mounting ring for adapting the clutch to a relatively low range of air pressures, this figure showing the clutch engaged.

The construction shown in the drawings is a spring loaded, air released clutch for controlling the drive from a driving sheave or fly wheel 6 to the driven crank shaft 7 of the compressor. The fly wheel drive sheave 6 has a hub portion 8 which is mounted on an anti-friction ball bearing 9. The latter is in turn supported on a reduced portion 11 of the compressor shaft, and is held against a thrust shoulder 12 on the shaft. Formed integrally with the fly wheel casting is an intermediate annular mounting flange 14 which is joined with the fly wheel rim by spokes 16, and with the hub 8 by a web portion 17. This mounting flange 14 is adapted to support the driving clutch element, designated 20. This driving clutch element 20 is adapted to be clutched between two driven clutch elements 21 and 22, as I shall later describe.

Since the compressor crankshaft and driven clutch elements must remain stationary for long periods while the fly-wheel and driving element revolve continuously, it is of the utmost importance that there be no drag or running contact between the friction facing and driven plates. To insure this condition, the clutch driving element 20 is preferably made according to the teachings of my prior Patents No. 2,259,461 and No. 2,303,201, which construction affords a positive axial positioning of the drive disc due to the flexibility of the attaching fingers. In the present improved structure, this clutch disc 20 is made up of a series of arcuate clutch segments 23, best shown in Figures 3 and 6. Flexible mounting fingers 24 project from the periphery of each arcuate segment 23 for mounting on cap screws 26 which thread into the flange 14. The cap screws pass through externally threaded sleeves or grommets 27 which have riveted mounting in the apertured ends of the fingers 24, and these threaded sleeves or bushings are locked at different positions of inward or outward adjustment by lock nuts 28 which screw over the threaded exteriors 29 of the sleeves or bushings. The opposite sides of this flexible driving disc have layers of friction facing material 30 secured thereto for engagement with the driven clutch elements 21 and 22. These clutch segments 23 will be later described in greater detail in connection with Figures 6 and 7.

The driven clutch element 22 is preferably in the form of a casting having a radially extending web portion 32 and a mounting hub 33. This hub is secured fast to the compressor shaft 7, such as by drawing the hub up on a tapered section 34 of the shaft through a nut 35, and interposing a driven key 36 between matching keyways in the hub and in the shaft.

The other driven clutch plate 21 is also preferably in the form of a casting, and is provided with a plurality of guiding push studs or pins 38 which have sliding guided movement in guide holes 39 formed in the web 32 of the outer clutch plate 22. These guiding push studs 38 compel the two driven clutch plates 21 and 22 to rotate together at all times, but permit the inner clutch plate 21 to be shifted inwardly away from the outer clutch plate 22 in a clutch releasing operation. Such inward shifting movement is normally opposed by a series of helical compression springs 41 which are confined between the inner side of the clutch plate 21 and a spring mounting spider or ring 42. The outer or front ends of these springs seat in circular pockets 43 formed in the back surface of the clutch plate 21, and the inner ends of the springs seat in similar cylindrical pockets 44 formed in the front face of the ring or spider 42. This latter ring or spider has a hub portion 46 which is assembled over the hub portion 33 of the outer clutch plate and is held against displacement therefrom by a snap locking ring 47. It will be seen that the normal tendency of the springs 41 is to hold the clutch engaged by compressing the two driven clutch plates 21 and 22 together against the opposite surfaces of the driving clutch element 20.

Referring now to the interchangeable sizes of power units for releasing the clutch, these power units are adapted to be carried by a mounting support in the form of an outwardly extending flange or ring 49 formed integral with the outer driven clutch disk 22. Figure 1 illustrates the larger size of power unit, designated 50a, for operation by the lower range of air pressures, and Figure 2 illustrates the smaller size of power unit, designated 50b, for operation by the higher range of air pressures. Each of these two power units comprises a mounting head 51a and 51b, respectively, which are adapted for interchangeable mounting within the mounting ring 49. Both mounting heads have an identical outer diameter, and both are formed with a shouldered offset 52 for abutting against an inwardly extending abutment flange 53 formed in the mounting ring 49. After the mounting head 51a or 51b has been inserted into the mounting ring 49, in engagement against the abutment flange 53, the mounting head is held in place by snapping a lock ring 55 into an internal locking groove 56 formed in the mounting ring 49 just on the outer side of the head 51a or 51b. This snap locking ring 55 can be readily inserted into and removed from the groove 56 by the operation of an appropriate tool, as is well known.

The mounting heads 51a and 51b constitute the head ends of the compressed air cylinders 58a and 58b, respectively, these cylinder formations being bored out in the formation of the cast head 51a or 51b. Sliding within the large cylinder 58a is a large piston 59a, and sliding within the small cylinder 58b is a small piston 59b. Each of these pistons carries an O-type of sealing ring 61 confined within an annular groove 62 in its periphery, such ring being preferably composed of Neoprene synthetic plastic, rubber or the like. These sealing rings are well known for holding high air pressures. The rear side of each piston 59a and 59b is formed with a thrusting surface 63 adapted to abut against the ends of the guided shifter pins 38 for transmitting shifting movement to the driven clutch element 21. A portion of this thrust surface 63 overlies the front face of the hub 33, so that the inward shifting movement of the piston is limited by this thrusting surface striking the front end of the hub 33. Figure 2 illustrates the clutch disengaged under the action of the compressed air forcing the piston to the left for permitting the driving clutch disc 20 to assume a released position, disposed centrally, out of contact with both driven clutch elements 21 and 22. Figure 1 illustrates the clutch engaged by the action of the springs 41, which occurs as soon as the compressed air is released from the power cylinder. Attention is directed to the fact that by having the series of compression springs 41 confined on the inner side of the friction disk clutch assembly 20, 21, 22, i. e. between the clutch disks 20—22 and the fly wheel 6, the compression springs will remain confined or self-contained within the over-all clutch assembly during the operation of interchanging the large and small power units 50a and 50b, and also during the operation of removing and replacing either power unit for inspection or repair. These springs 41 have relatively high compression pressures set up therein in the original assembly of the clutch, but these original pressures are not disturbed or released in the above operations of interchanging power units, or removing and replacing a power unit for inspection or repair.

Each of the cylinder heads 51a and 51b is provided with a rotating seal 65 through which compressed air is admitted into the cylinder area. This rotating seal is mounted in a central boss 66 which has a relatively large axial bore 67, a smaller bore 68, and a still smaller bore 69. Mounted in the larger bore 67 is a pair of laterally spaced ball bearings 71 which rotatably support a stationary hollow quill 72. This quill comprises an outer connector block portion 73 having a right angle tapped bore therein for receiving the compressed air pipe 73' and the inner end of the quill is formed with a reduced neck 74 extending into the smaller counterbores 68 and 69. A yieldable or resilient packing ring 75, preferably composed of Neoprene, is arranged to have a snug fit between this reduced neck portion 74 and the intermediate counterbore 68. The front edge of this Neoprene ring is of V-shaped cross section so as to augment the action of the compressed air tending to expand lip portions of the Neoprene ring inwardly and outwardly against the reduced stem 74 and counterbore 68. A backing thimble or ring 76 is interposed between the outer end of the Neoprene ring 75 and the outer race of the inner ball bearing 71, this backing ring being composed of metal, plastic or other rigid material. The rotary seal is maintained in its assembled relation in the boss 66 by a snap ring 77 which snaps into an annular groove in the inner portion of the quill 72, and by another locking ring 79 which snaps into an internal annular groove within the bore 67. The inner locking ring 77 holds the quill from endwise displacement with respect to the ball bearings, and the outer ring 79 holds the ball bearings from endwise displacement with respect to the bore 67. A closure ring 79' retains lubricant in the bearings and excludes dirt. The Neoprene packing ring 75 is molded to have the tapering cross section shown in Figure 5. It will be noted that this taper is obtained by forming the ring with a conical outer surface 75a and a conical inner surface 75b, both of which surfaces diverge in separating relation toward that end of the ring which has the annular V-shaped notch 75c. When this compressible ring is forced into the cylindrical bore 68 of the boss 66, and the cylindrical outer surface 74a of the quill neck 74 is thereafter pushed through the center of the ring, the thicker notched end of the ring is thereby compressed down to the same radial thickness as the small end. This results in the notched end of the ring being placed in a state of permanent compression, with the result that the outer lip of the notched end tends constantly to expand outwardly against the bore 68 and the inner lip tends constantly to compress inwardly against the quill neck 74. This prestressed condition of the notched end of the ring aids materially in maintaining a tight joint without imposing undue friction along the entire ring. The ring is preferably compelled to revolve with the boss 66 and cylinder assembly. To this end, the outer surface 74a of the quill neck 74 is provided with an accurately ground finish, and this ground finish is also preferably chromium plated. Hence, minimum friction exists between the sealing ring 75 and the surface 74a, and hence the sealing ring is caused to revolve with the outer bore surface 68. The high finish given the surface 74a minimizes wear of the sealing ring 75, and also coacts with the inward pressure of the ring to insure a tight seal at this revolving joint. The pair of ball bearings 71—71 establish and maintain a very accurate alignment between the surfaces 68 and 74a, which is an important factor in preserving the life of the sealing ring 75. Replacement of this ring can easily be accomplished by releasing the locking ring 79, and then withdrawing the entire rotating seal assembly from within the boss 66.

Referring now in greater detail to the construction of the clutch segments 23, it will be seen from Figures 6 and 7 that the metallic segment 23' has the two flexible mounting fingers 24 formed integrally therewith, as disclosed in my prior Patents 2,259,461 and 2,303,201. However, I have devised an improved manner of mounting or attaching these fingers to the flywheel 6 or annulus 14 which possesses advantages over the practice shown in my prior patents. As previously described herein, the ends of these flexible fingers 24 have circular apertures 24' therein, and riveted in these apertures are the externally threaded bushings or grommets 27. Screwing over the threads of these bushings are the lock nuts 28. In mounting the segments, the cap screws 26 are merely passed through the axial openings 27' of the bushings and screwed into tapped holes 31 provided in the annulus 14. The nuts 28 are then screwed back and forth along the bushings 27 until the flexible fingers 24 are all properly aligned with each other in the desired plane for properly disposing the clutch segments with respect to the two driven clutch elements 21 and 22. After adjusting the nuts 28 to the proper positions along the bushings 27, the adjustments are rigidly locked up by tightening the cap screws 26 inwardly against the outer ends of the bushings. It will be noted that the adjustment of the nuts 28 is comparable to increasing or decreasing the effective lengths of the bushings 27. In this construction, the only tapped bores necessary in the flywheel or annulus are the bores 31; no threaded counterbores are necessary for the threaded bushings.

The adjacent ends of adjacent segments 23 are adapted to be interconnected by interlocking fingers 80 and 81, the finger 80 projecting inwardly from one outer corner of the segment and the finger 81 projecting outwardly from the opposite inner corner of the segment. Both of these fingers are punched out as integral portions of the metallic segment blank 23', and have a radial length equal to about one-half the radial depth of the segment. Punched out directly behind these fingers are recesses or cavities 80' and 81' which are of approximately the same shape as the opposite fingers. Thus, in the assembly of adjacent segments, the outer finger 80 of one segment is hooked behind the inner finger 81 of the next adjacent segment, so as to lie within the finger-shaped pocket 81' behind the finger 81, as indicated in dotted lines in Figure 6. This hooking together of the outer and inner fingers of adjacent segments is continued on around the circle until the entire flexible disc has been assembled. The friction facings 30 are extended out to the corners of the segments to overlie or cover the pockets 80' and 81'. Thus, when the fingers are hooked into these pockets, they are laterally restrained by the friction facings, so that the fingers cannot become accidentally displaced sidewise from the pockets. It will be noted that each outer finger 80 and its pocket 80' are practically the physical counterparts of each inner finger 81 and its pocket 81'. Also, the segments can be assembled with greater facility by reason of this relation of fingers and pockets.

It will be seen from the foregoing that the factory need only manufacture and stock one size or model of my improved clutch structure for use with any range of air pressures, ranging anywhere from 50 pounds to 1000 pounds per square inch or more. As orders are received for clutches to operate in the lower pressure ranges, the larger size power units 50a are assembled in these clutches, and conversely, as orders are received for clutches to operate in the higher pressure ranges, the smaller size power units 50b are assembled therein. Thus, the possibility of breaking the clutch structure by the development of excessively large operating forces is avoided. If it is desired to substitute one power unit for the other in the case of a clutch which has already been installed, it is only necessary to disconnect the compressed air pipe 73' from the connector portion 73 of quill 72, and remove the cylinder locking ring 55, whereupon the cylinder and piston assembly can be readily removed in its entirety and the other cylinder and piston assembly substituted for it.

It should also be noted that my invention permits ready removal of the cylinder and piston assembly for inspection of the parts, or replacement of the O-ring 61, or substitution of a new assembly of the same size in the event of leakage or wear of the original assembly. Also, three or more different sizes of assemblies may be provided instead of only the two sizes 50a and 50b. As previously remarked, in these operations of interchanging power units, or removing and replacing a power unit for inspection or repair, the compression springs 41 remain confined with the clutch assembly, so that their original spring pressure is not disturbed or lost in the operation, and there is no necessity of having to restore spring pressure after a power unit has been removed for interchange or repair.

While I have illustrated and described what I regard to be the preferred embodiment of my invention, nevertheless numerous modifications and rearrangements may be made therein without departing from the essence of the invention.

I claim:

1. In an air operated friction clutch of the class described, the combination of driving and driven friction clutch elements, one of which is shiftable for establishing and releasing clutching engagement, compression spring means normally tending to shift said shiftable clutch element in a clutch engaging direction, a circular mounting ring rotating directly with one of said clutch elements and disposed coaxially thereof, said circular mounting ring defining a circular mounting socket concentric of said clutch elements and open at the outer end of said clutch, a circular inwardly extending shoulder flange defining the inner end of said mounting socket, a circular groove in said mounting ring adjacent to the outer end of said mounting socket, a compressed air power unit comprising cylinder and piston members, said piston member being slidable within said cylinder member, a mounting flange extending peripherally from said cylinder member and adapted to seat in said circular mounting socket in abutment against said shoulder flange, a releasable snap locking ring having seating engagement in said circular groove and abutting said mounting flange for releasably holding said cylinder member in said mounting socket, said compressed air power unit being adapted for interchangeable insertion into said mounting socket so as to permit ready substitution by another compressed air power unit having a different diameter of cylinder and piston, means for transmitting shifting movement from said shiftable piston member to said shiftable clutch element in a clutch releasing direction in opposition to the action of said spring means, and means for retaining said spring means confined within the clutch assembly in substantially its original state of compression in the operation of interchanging power units.

2. In an air operated clutch of the class described, the combination of driving and driven clutch elements, one of which is shiftable for establishing and releasing clutching engagement, a mounting support disposed in axial alignment with one of said clutch elements and rotating therewith, a compresesd air power unit sub-assembly adapted to be mounted upon said mounting support at the outer end of the clutch, said power unit sub-assembly comprising coacting cylinder and piston members, one shiftable and the other non-shiftable, and a rotary seal carried by the non-shiftable member for admitting compressed air into said power unit, said cylinder and piston members and rotary seal being aligned coaxially with the axis of said clutch elements, spring means normally tending to shift the shiftable clutch element in one direction, said spring means being disposed on the opposite side of said clutch elements from said compressed air power unit means for transmitting motion from said shiftable power unit member to said shiftable clutch element in the opposite direction in opposition to said spring means, and means for mounting said power unit as a complete subassembly upon said mounting support.

3. In an air operated clutch with interchangeable air operated power units, the combination of a driven shaft, a driving fly wheel rotatably mounted concentrically of said driven shaft, a driving clutch disk mounted on said fly wheel, a driven hub structure mounted on said driven shaft on the outer side of said fly wheel, a pair of driven clutch disks, one of which is shiftable, carried by said driven hub structure and adapted to establish clutching engagement with said driving clutch disk, compression spring means disposed on the inner side of said driving and driven clutch disk between said clutch disks and fly wheel and normally tending to shift said shiftable clutch disk in one direction, a mounting support carried by and rotating with said driven hub structure and disposed on the outer side of said driving and driven clutch disks, an interchangeable compressed air power unit removably mounted in said mounting support, said power unit comprising a single cylinder and piston having their axis aligned with the axis of said driven shaft and hub structure, said cylinder rotating directly with said driven hub structure but being held thereby against endwise shifting movement, a rotary seal for admitting compressed air into said cylinder for imparting endwise shifting movement to said piston, and means for transmitting such shifting movement of said piston to said shiftable clutch disk in a direction in opposition to the action of said compression spring means, said compressed air power unit being adapted for readily interchangeable insertion into and removal from said mounting support so as to permit ready substitution by another compressed air power unit having a different diameter of cylinder and piston, the disposal of said compression spring means in the space between the inner side of said clutch disks and the outer side of said fly wheel serving to retain said spring means within the clutch assembly during the above operation of interchanging power units.

4. In an air operated clutch with interchangeable air operated power units, the combination of a driven shaft, a driving fly wheel rotatably mounted concentrically of said driven shaft, a driving clutch disk mounted on said fly wheel, a driven hub structure mounted on said driven shaft on the outer side of said fly wheel, a non-shiftable driven clutch disk carried by said driven hub structure and disposed on the outer side of said driving clutch disk, a shiftable driven clutch disk carried by said driven hub structure and disposed on the inner side of said driving clutch disk, a spider mounted on said driven hub structure between said shiftable driven clutch disk and said fly wheel, compression springs confined between said spider and said shiftable driven clutch disk and normally tending to shift said shiftable driven clutch disk outwardly for frictionally gripping said driving clutch disk between said two driven clutch disks, push studs carried by said shiftable driven clutch disk projecting outwardly through apertures in said non-shiftable driven clutch disk, a circular mounting ring carried by and rotating with said driven hub structure and extending outwardly of said non-shiftable driven clutch disk concentrically thereof, an interchangeable compressed air power unit removably mounted in said mounting ring and rotating directly therewith, said power unit comprising a single cylinder and piston having their axis aligned with the axis of said driven shaft and hub structure, means for holding said cylinder against shifting movement in said mounting ring, and a rotary seal for admitting compressed air to said cylinder for imparting shifting movement to said piston, the inner end of said piston imparting inward shifting movement to said push studs for shifting said shiftable driven clutch element inwardly into clutch releasing position against the pressure of said compression springs, said compressed air power unit being adapted for readily interchangeable insertion into and removable from said mounting ring so as to permit ready substitution by another compressed air power unit having a different diameter of cylinder and piston, the disposal of said compression springs in the space between the inner side of said clutch disks and the outer side of said fly wheel serving to retain said spring means confined within the clutch assembly in substantially their original state of compression during the operation of interchanging power units.

References Cited in the file of this patent

UNITED STATES PATENTS

| Number | Name | Date |
|---|---|---|
| 1,113,711 | Strand | Oct. 13, 1914 |
| 1,197,539 | Plummer | Sept. 5, 1916 |
| 1,401,551 | Parsons | Dec. 27, 1921 |
| 2,057,744 | Sanford | Oct. 20, 1936 |
| 2,106,472 | Aikman | Jan. 25, 1938 |
| 2,143,861 | Clouse | Jan. 17, 1939 |
| 2,211,191 | Wolfrom | Aug. 13, 1940 |
| 2,277,603 | Nutt et al. | Mar. 24, 1942 |
| 2,331,615 | Meyer | Oct. 12, 1943 |
| 2,333,308 | Goodwin | Nov. 2, 1943 |
| 2,384,182 | Lewis | Sept. 4, 1945 |
| 2,408,327 | McLean | Sept. 24, 1946 |
| 2,489,441 | Warren | Nov. 29, 1949 |
| 2,517,955 | Zimmerman | Aug. 8, 1950 |
| 2,553,376 | Tourreau | May 15, 1951 |

FOREIGN PATENTS

| Number | Country | Date |
|---|---|---|
| 677,960 | Germany | July 5, 1939 |
| 508,883 | Great Britain | July 7, 1939 |